(12) United States Patent
Jin (10) Patent No.: US 8,265,422 B1
(45) Date of Patent: Sep. 11, 2012

(54) METHOD AND APPARATUS FOR REMOVING GENERAL LENS DISTORTION FROM IMAGES

(75) Inventor: Hailin Jin, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 854 days.

(21) Appl. No.: 12/390,317

(22) Filed: Feb. 20, 2009

(51) Int. Cl.
    *G06K 9/40*     (2006.01)
    *H04N 9/74*     (2006.01)

(52) U.S. Cl. .......................... 382/275; 348/580

(58) Field of Classification Search .................. 382/275, 382/276, 289–297, 100; 348/571, 580, 583, 348/744; 345/645, 647
See application file for complete search history.

(56) References Cited

U.S. PATENT DOCUMENTS

| | | | |
|---|---|---|---|
| 5,892,590 | A | 4/1999 | Ida et al. |
| 5,960,108 | A * | 9/1999 | Xiong .......................... 382/154 |
| 6,816,625 | B2 | 11/2004 | Lewis, Jr. et al. |
| 7,126,616 | B2 * | 10/2006 | Jasa et al. ...................... 345/645 |
| 7,245,761 | B2 | 7/2007 | Swaminathan et al. |
| 7,280,706 | B2 | 10/2007 | Wu et al. |
| 2003/0043303 | A1 * | 3/2003 | Karuta et al. ................. 348/744 |
| 2004/0012544 | A1 | 1/2004 | Swaminathan et al. |
| 2004/0156558 | A1 | 8/2004 | Kim |

OTHER PUBLICATIONS

James C. Wyant, "Basic Wavefront Aberration Theory for Optical Metrology," 1992.
Jean-Philippe Tardif, Peter Sturm, and Sebastien Roy, "Self-calibration of a general radially symmetric distortion model," ECCV 2006.
Dongil Han, "Real-Time Digital Image Warping for Display Distortion Correction," ICIAR 2005, LNCS 3656, pp. 1258-1265, Springer-Verlag Berlin Heidelberg, 2005.
Karl M. Fant, et al., "A Nonaliasing, Real-Time Spatial Transform Technique," IEEE, 1986.
Ed Catmull, et al., "3-D Transformations of Images in Scanline Order," ACM, 1980.

(Continued)

*Primary Examiner* — Yon Couso
(74) *Attorney, Agent, or Firm* — Robert C. Kowert; Meyertons, Hood, Kivlin, Kowert & Goetzel, P.C.

(57) ABSTRACT

Method and apparatus for removing general geometric lens distortion from images. A geometric distortion removal algorithm is implemented according to a general 5-parameter distortion model that includes both radial and tangential lens distortion components. The algorithm may be implemented in a two-stage process in which one-dimensional elements in one planar dimension (rows or columns) of an input image with geometric distortion are rendered to generate an intermediate buffer, and then one-dimensional elements in the other planar dimension (columns or rows) of the intermediate buffer are rendered to generate an output image with geometric distortion reduced or removed. Thus, one-dimensional sampling is performed, and interpolation is performed in one planar dimension, rather than 2-D interpolation. An input row or column may be decimated, if necessary, before row or column interpolation is performed to generate an output row or column. Since decimation is performed in one dimension, aliasing artifacts may be prevented.

29 Claims, 8 Drawing Sheets

OTHER PUBLICATIONS

Philip K. Robertson, "Spatial Transformations for Rapid Scan-Line Surface Shadowing," IEEE Computer Graphics and Applications, Mar. 1989, No. 2, Los Alamitos, CA.

Donald Fraser, "Comparison at High Spatial Frequencies of Two-Pass and One-Pass Geometric Transformation Algorithms," Computer Vision, Graphics and Image Processing 46, 267-283, No. 3, Jun. 1989.

Alvy Ray Smith, "Planar 2-Pass Texture Mapping and Warping," ACM Computer Graphics, vol. 21, No. 4, Jul. 1987.

Chein-Wei Jen, et al., "Two-Level Pipeline Design for Image Resampling," V2.6, IEEE 1989.

Gergely Vass, et al., "Applying and Removing Lens Distortion in Post Production," Second Hungarian Conference on Computer Graphics and Geometry, 2003, pp. 1-8.

George Wolberg, et al., Separable Image Warping with Spatial Lookup Tables, Dept. of Computer Science, Columbia University, Computer Graphics, vol. 23, No. 3, Jul. 1989.

U.S. Appl. No. 12/128,164, filed May 28, 2008.

* cited by examiner

METHOD AND APPARATUS FOR REMOVING GENERAL LENS DISTORTION FROM IMAGES

BACKGROUND

Description of the Related Art

Figure 1A:
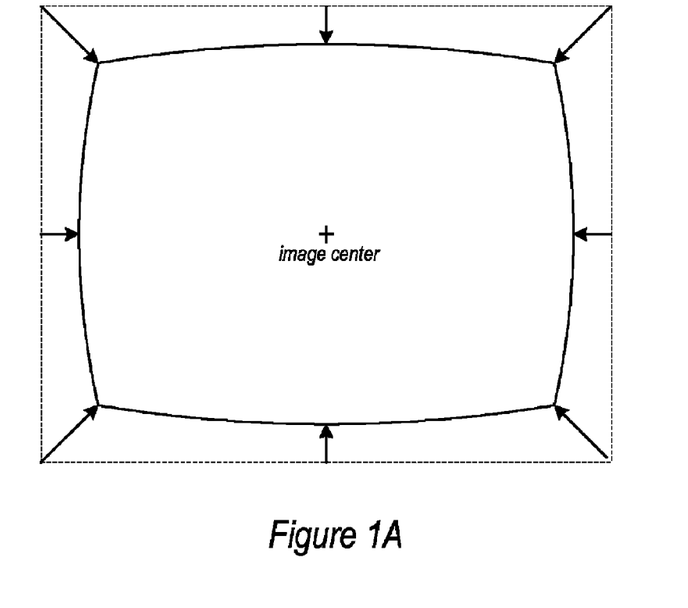
FIGS. 1A and 1B illustrate two types of radial distortion, barrel distortion and pincushion distortion, respectively.
Figure 1B:
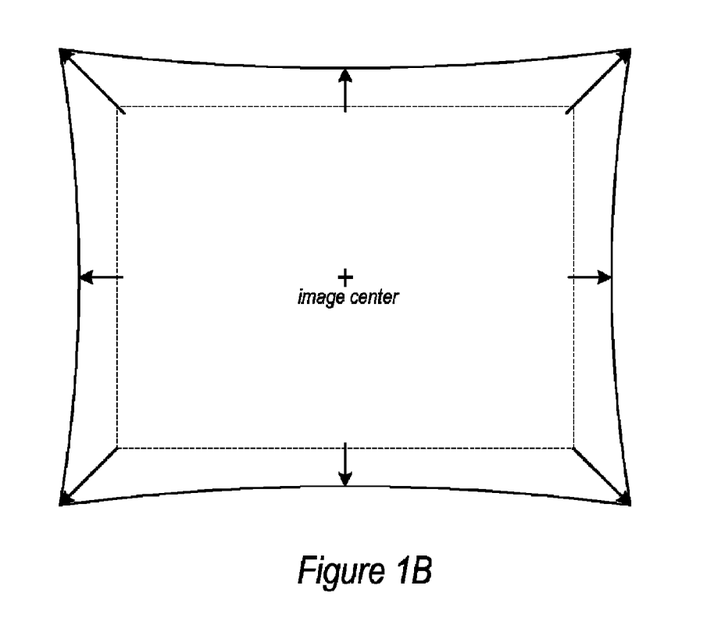
Figure 2:
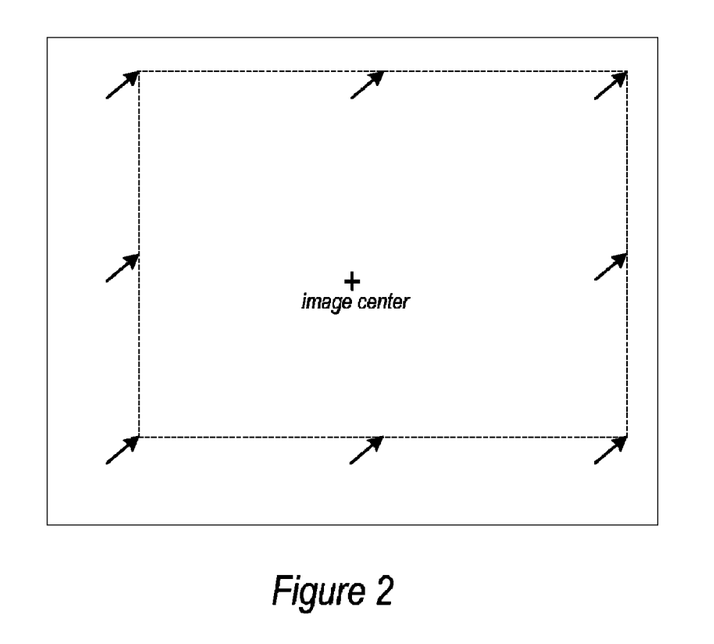
FIG. 2 illustrates tangential distortion.
Figure 3:
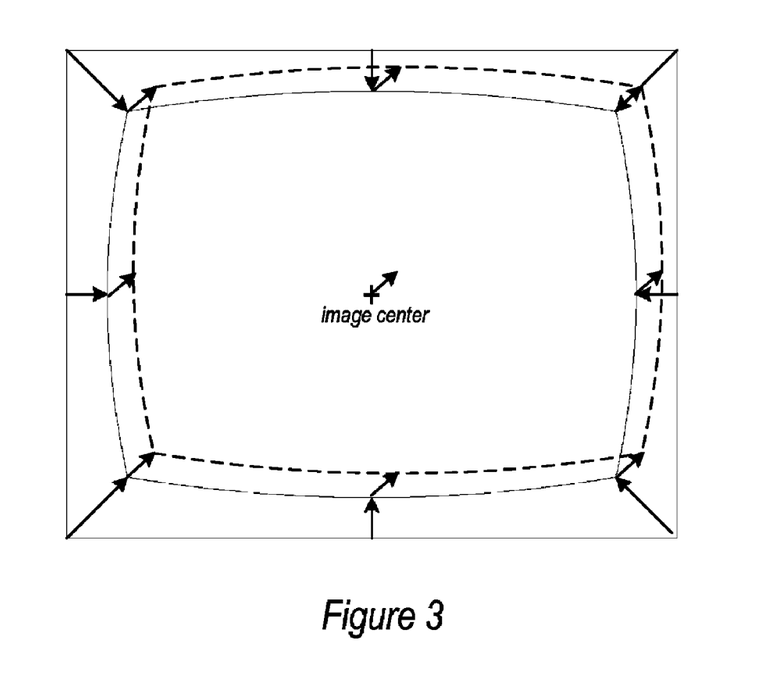
FIG. 3 illustrates an image with lens distortion including both radial and tangential distortion components.

Most, if not all, captured images include at least some geometric distortion introduced primarily by the camera lens components. Geometric lens distortion may be classified into two primary types—radially symmetric distortion and tangential distortion. Radially symmetric distortion, or simply radial distortion, may be present in captured images, for example as a result of the optical characteristics of lenses in conventional (film) and digital cameras. FIGS. 1A and 1B illustrate examples of radial distortion. Radial distortion may be classified into two types: barrel distortion, as illustrated in FIG. 1A, and pincushion distortion, as illustrated in FIG. 1B. Barrel distortion is typically associated with wide-angle lenses, while pincushion distortion is typically associated with long-range or telescopic lenses. Tangential distortion may, for example, be present in a captured image as a result of imperfect alignment of lens elements or other manufacturing defects in a compound lens. Tangential distortion is sometimes referred to as decentering distortion. FIG. 2 illustrates an example of tangential distortion. Many if not most captures images will include at least some general geometric lens distortion consisting of both radial distortion and tangential lens distortion components. FIG. 3 illustrates an example of geometric lens distortion with both barrel distortion and tangential distortion components.

In digital image processing, a distortion removal process renders an image with little or no distortion from an image with distortion. Conventionally, in digital image processing, geometric lens distortion removal has been performed using a two-dimensional (2-D) sampling process. For example, in a conventional algorithm, a grid may be set in the output image (the image without lens distortion). For each point in the grid, a corresponding location is found in the input image according to a distortion equation. Since this location may not have integral coordinates, 2-D interpolation may be used to obtain the intensity value for the output image. There are problems associated with these conventional processes. One problem is that conventional distortion removal algorithms are not very efficient; the full equation has to be solved for each point in the image. Another problem is that interpolation is done in two-dimensional (2-D) space, which is inefficient when sophisticated interpolation techniques such as cubic or bi-cubic interpolation are used. In addition, conventional algorithms may suffer from aliasing problems. Aliasing refers to a distortion or artifact that is caused by a signal being sampled and reconstructed as an alias of the original signal. An example of image aliasing is the Moiré pattern that may be observed in a poorly pixelized image of a brick wall. Conventional algorithms, which perform interpolation in 2-D space, may in so doing introduce aliasing artifacts into the output image.

SUMMARY

Various embodiments of a method and apparatus for removing general geometric lens distortion from images are described. Embodiments may implement an efficient geometric distortion removal algorithm for producing perspective images from input images with general geometric lens distortion. The geometric distortion removal algorithm is implemented according to a general 5-parameter distortion model that includes both radial lens distortion and tangential lens distortion components. Embodiments may decompose the geometric distortion removal process into two stages. The algorithm may thus be implemented in a two-stage process that renders one-dimensional elements in one planar dimension (rows or columns) of an input image with general geometric distortion to generate an intermediate buffer, and then renders one-dimensional elements in the other planar dimension (columns or rows) of the intermediate buffer to generate an output image with the geometric distortion reduced or removed. Thus, one-dimensional sampling is performed, and interpolation may be performed in one planar dimension, rather than 2-D interpolation. Implementations of embodiments of the method for removing general geometric lens distortion from images may be referred to herein as a geometric distortion removal module.

In some embodiments, the geometric distortion removal module receives an input image with general geometric distortion and iteratively renders rows in the input image to generate an intermediate buffer. The geometric distortion removal module then iteratively renders columns in the intermediate buffer to generate an output image with geometric distortion reduced or removed. In another embodiment, column rendering may be performed first to generate the intermediate buffer, and then row rendering performed on the intermediate buffer to generate the output image. Decimation may be performed on the rows and columns if necessary.

Unlike conventional geometric distortion removal processes, embodiments decompose the geometric distortion removal process into two stages. In each stage, only one row or one column of an image is rendered. In each stage, a simpler equation than the full geometric distortion removal algorithm is solved. Moreover, interpolation is performed in each stage in one-dimensional space (i.e., on one row or one column at a time), which is more efficient than 2-D interpolation, and reduces or eliminates aliasing artifacts that may be introduced in 2-D interpolation. Because embodiments perform one-dimensional (row or column) sampling, an input row or column may be decimated, if necessary, before row or column interpolation is performed to generate an output row or column. Decimation is important in reducing or eliminating aliasing artifacts.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of a method and apparatus for removing general geometric distortions from images are described. Embodiments may implement an efficient geometric distortion removal algorithm for producing perspective images from input images with general geometric lens distortion. An ideal lens provides ideal perspective projection and thus only introduces perspective distortion; that is, each point in 3-D space gets projected onto a 2-D image plane in a perspective image. Straight lines in space are captured at the image plane as straight lines in the perspective image. However, in practice, lenses are not ideal lenses, and introduce some amount of nonlinear geometric distortion, which may include radial and tangential distortion components, into captured images. Embodiments may take these input images including general geometric distortion and remove the geometric distortion to generate output images that are or are close to perspective images.

The geometric distortion removal algorithm may be implemented according to a general 5-parameter distortion model that includes both radial lens distortion and tangential lens distortion components. The algorithm may be implemented in a two-stage process, described below. Values for the five distortion parameters are assumed to be known. The values, for example, may have been previously estimated using any of various techniques, for example a camera/lens calibration technique. Advantages of the geometric distortion removal algorithm when compared to conventional methods may include, but are not limited to, efficiency, the ability to use sophisticated interpolation schemes, and the reduction or removal of aliasing when the sizes of the input and output images differ.

Embodiments may decompose the process of removing geometric distortion from images into two stages. Embodiments render one-dimensional elements in one planar dimension (rows or columns) of a geometrically distorted input image to an intermediate buffer, and then render one-dimensional elements in the other planar dimension (columns or rows) of the intermediate buffer to generate an output image with the geometric distortion of the input image removed or reduced. Thus, one-dimensional sampling is performed, and interpolation may be performed in one planar dimension, rather than 2-D interpolation.

Embodiments may be applied for removing general lens distortion in image processing software. Embodiments of the geometric distortion removal algorithm may, for example, be implemented as or in a tool, module, library function, plug-in, or stand-alone application. For simplicity, implementations of embodiments may be referred to herein as a geometric distortion removal module. The input images to the geometric distortion removal process may be images digitized from a photograph or negative captured with a conventional camera, digital images captured with a digital camera, digitally synthesized images, composite images formed from two or more source images, or in general digital images from any source.

Figure 4:
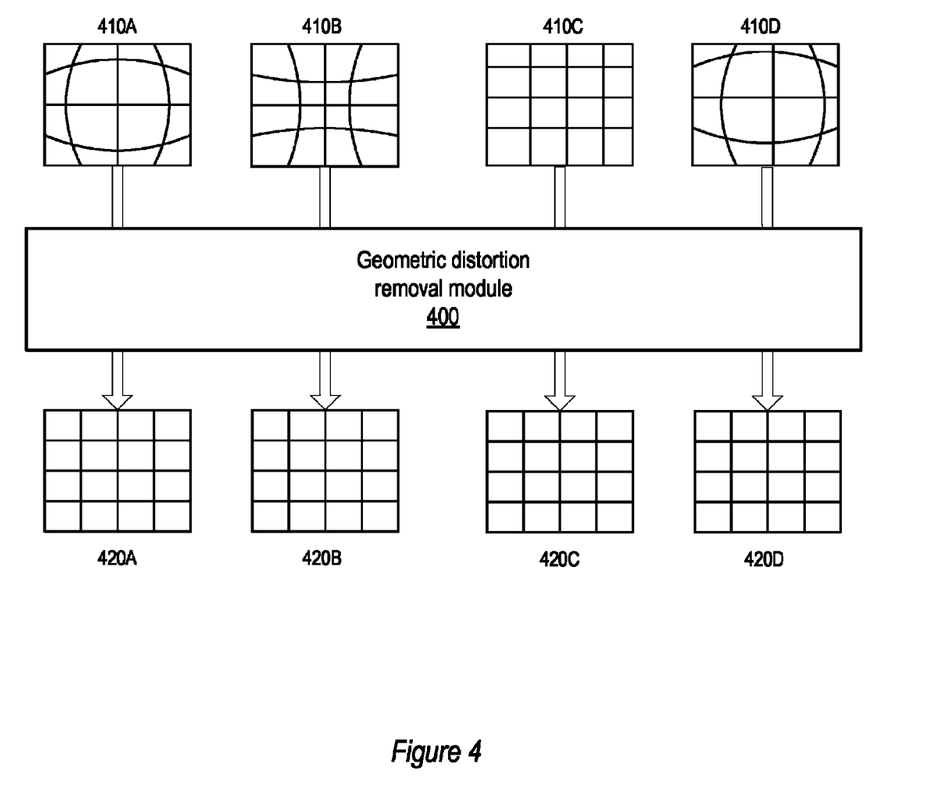
FIG. 4 illustrates a general geometric distortion module, according to some embodiments.

FIG. 4 illustrates a general geometric distortion removal module, according to some embodiments. Embodiments of the geometric distortion removal module 400 may implement a general geometric distortion removal algorithm or process, as described herein. The geometric distortion removal algorithm renders images with little or no geometric distortion (images 420A through 420D) from images with general geometric distortion consisting of either or both of radially symmetric and tangential components (images 410A through 410D). 410A shows an image with barrel distortion, 410B shows an image with pincushion distortion, image 410C shows an image with tangential distortion, and 410D shows an image with both radial and tangential distortion. The geometric distortion removal algorithm is efficient, and may provide improved interpolation in sampling, when compared to conventional geometric distortion removal processes that rely on 2-D interpolation techniques. In addition, the geometric distortion removal algorithm, through the use of 1-D interpolation techniques, may reduce or eliminate aliasing artifacts, which tend to be a problem in conventional geometric distortion removal processes that rely on 2-D interpolation techniques.

Figure 8:
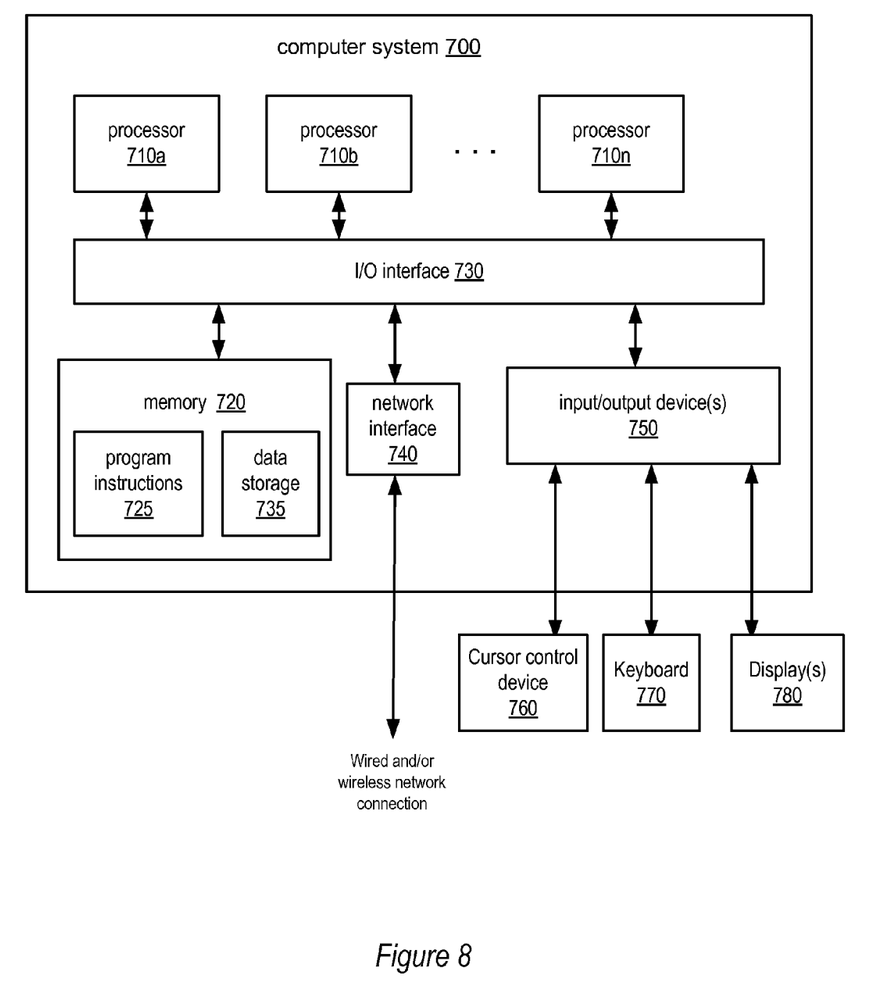
FIG. 8 illustrates an example computer system that may be used in embodiments.

Embodiments of a geometric distortion removal module 400 may be implemented on a computer system. An example system on which embodiments may be implemented is illustrated in FIG. 8. Geometric distortion removal module 400 may be implemented, for example, as or in a tool, module, library function, plug-in, or stand-alone software application. Embodiments of the geometric distortion removal module may be implemented, for example, in various digital image processing software. Examples of digital image processing software in which embodiments may be implemented may include, but are not limited to, Adobe Photoshop® and Adobe Camera Raw®. In addition to software implementations, firmware and hardware implementations of the geometric distortion removal module 400 are possible and contemplated. In addition, embodiments of a geometric distortion removal module 400 as described herein may be implemented in a digital camera to post-process captured images within the camera.

In some embodiments, geometric distortion removal module 400 may provide a user interface that provides one or more textual and/or graphical user interface elements, modes or techniques via which a user may control various aspects of the geometric distortion removal process. For example, the user interface may include user interface elements that allow a user to select input and output files, to specify output file dimensions or size, to specify a scaling factor, to control the degree of distortion to be removed, and so on.

The input images 410 may be any type of images, for example images digitized from photographs or negatives captured with a conventional camera, digital images captured with a digital camera, digital images captured with a photosensor such as a charge-coupled device (CCD), digitally synthesized images, composite images from two or more source images, panoramic images, component digital images to be stitched into a panoramic image, images from a video stream, and so on.

Figure 5:
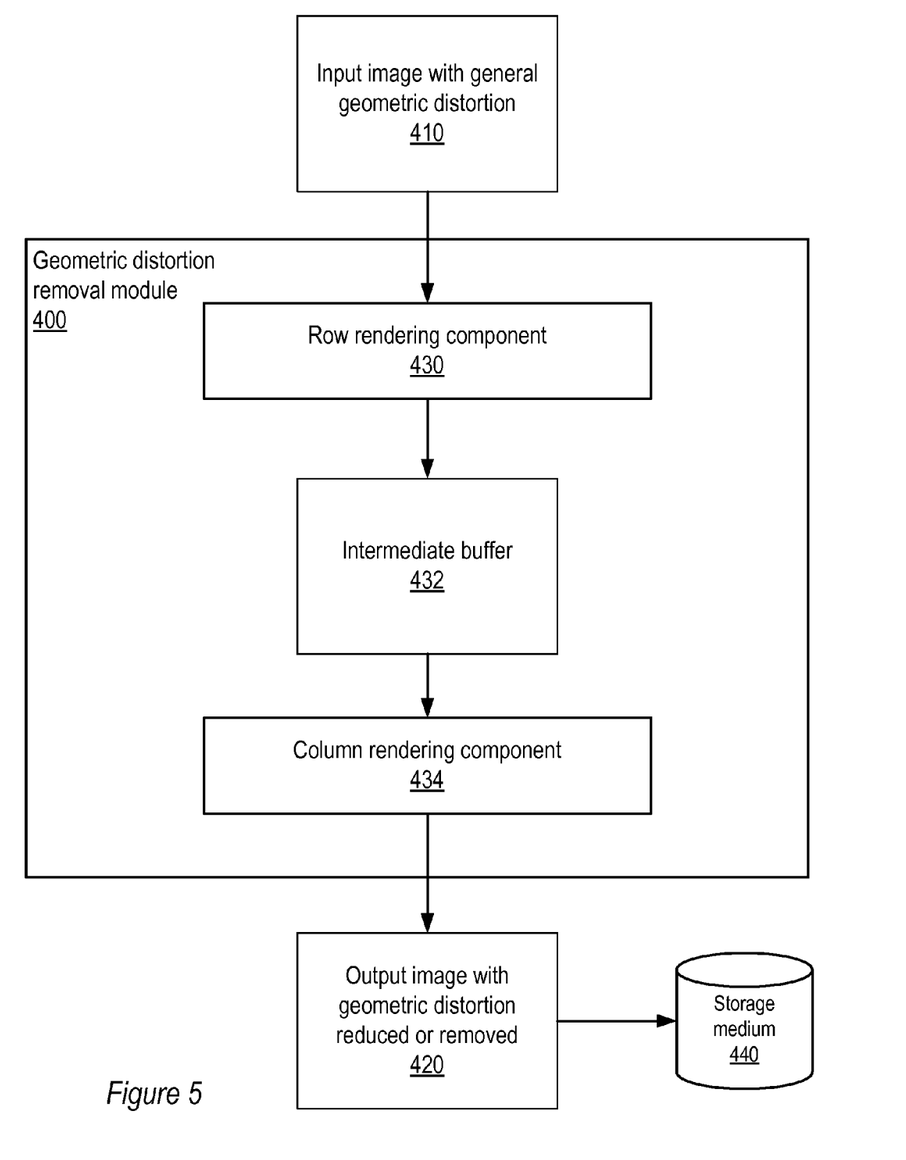
FIG. 5 illustrates a high-level architecture of and data flow through a general geometric distortion module, according to some embodiments.

FIG. 5 illustrates a general, high-level architecture for the geometric distortion removal module, according to some embodiments. Unlike conventional geometric distortion removal processes, embodiments decompose the geometric distortion removal process into two stages. In each stage, only one row or one column of an image is rendered. In each stage, a simpler equation than the full distortion equation is solved. Moreover, interpolation is performed in each stage in one-dimensional space (i.e., on one row or one column at a time), which is more efficient than conventional 2-D interpolation, and may reduce or eliminate aliasing artifacts that may be introduced in 2-D interpolation. Because embodiments perform one-dimensional (row or column) sampling in the geometric distortion removal process, an input row or column may be decimated, if necessary, before row or column interpolation is performed to generate an output row or column. Decimation is important in reducing or eliminating aliasing artifacts.

Referring to FIG. 5, geometric distortion removal module 400 receives an input image 410 including general geometric lens distortion. Row rendering component 430 iteratively renders rows from the input image 410 to an intermediate buffer 432. Column rendering component 434 then iteratively renders columns from the intermediate buffer 432 to generate an output image with the geometric distortion reduced or removed 420. Output image 420 may, for example, be stored to a storage medium 440, such as system memory, a disk drive, DVD, CD, memory card, etc. In some embodiments, column rendering may be performed first to generate intermediate buffer 432, and then row rendering performed on intermediate buffer 432 to generate output image 420.

While FIG. 5 shows an intermediate buffer 432 separate from output image 420, in some embodiments, instead of allocating separate buffers for the intermediate buffer and the output image, a single buffer may be allocated or otherwise obtained and used for both the intermediate buffer and the output image. The size of this buffer would be at least:

$$w_{max} \times h_{max}$$

where:

$$w_{max} = \max(w_1, w_2)$$

$$h_{max} = \max(h_1, h_2)$$

where ($w_1$, $h_1$) are the width and height needed for the intermediate buffer and ($w_2$, $h_2$) are the width and height of the output image. A temporary 1-D buffer of the proper size based on the input image row (or column) size may also be allocated or otherwise obtained.

Figure 6A:
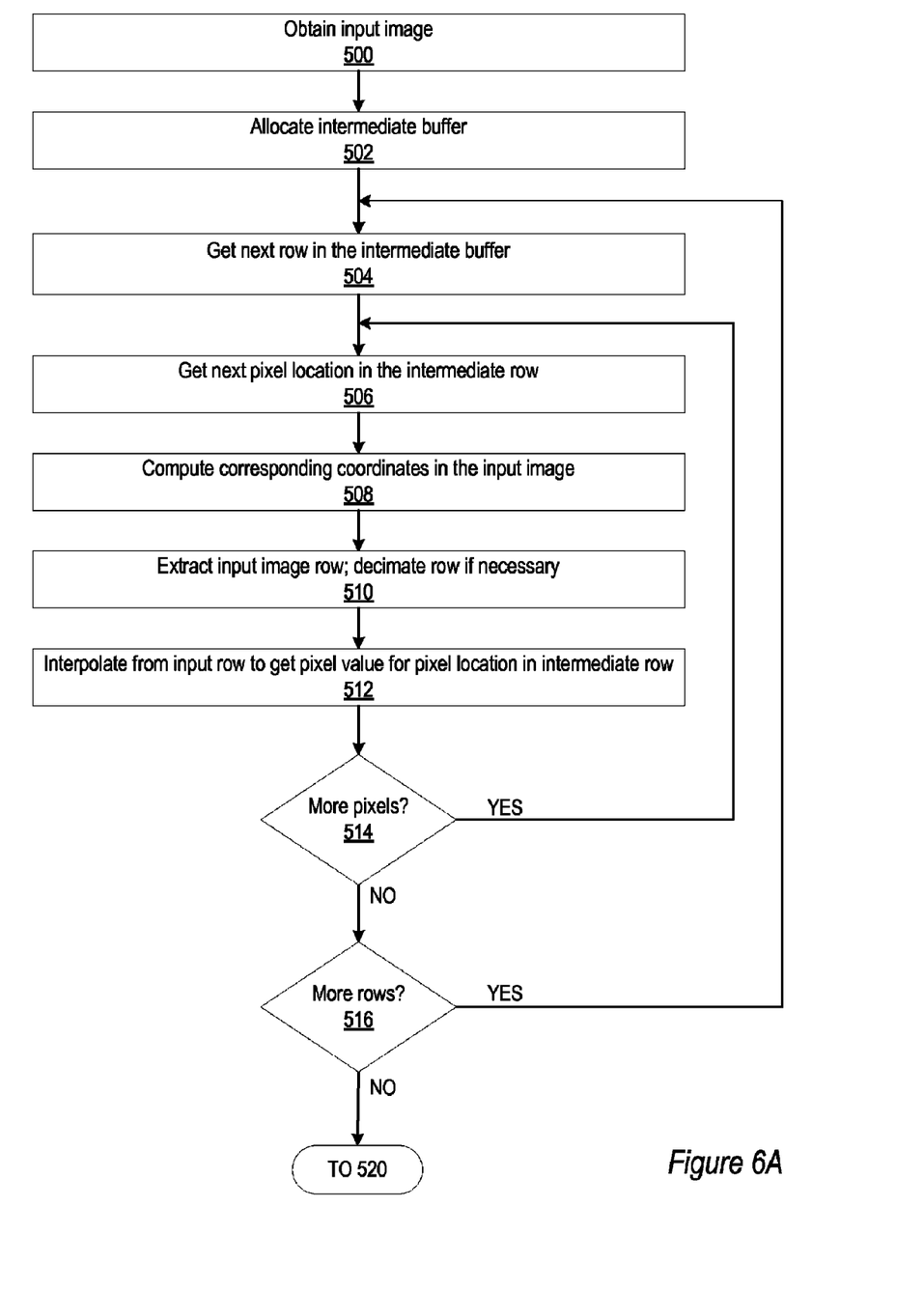
FIGS. 6A and 6B illustrate a method for removing general geometric distortions from images, according to some embodiments.
Figure 6B:
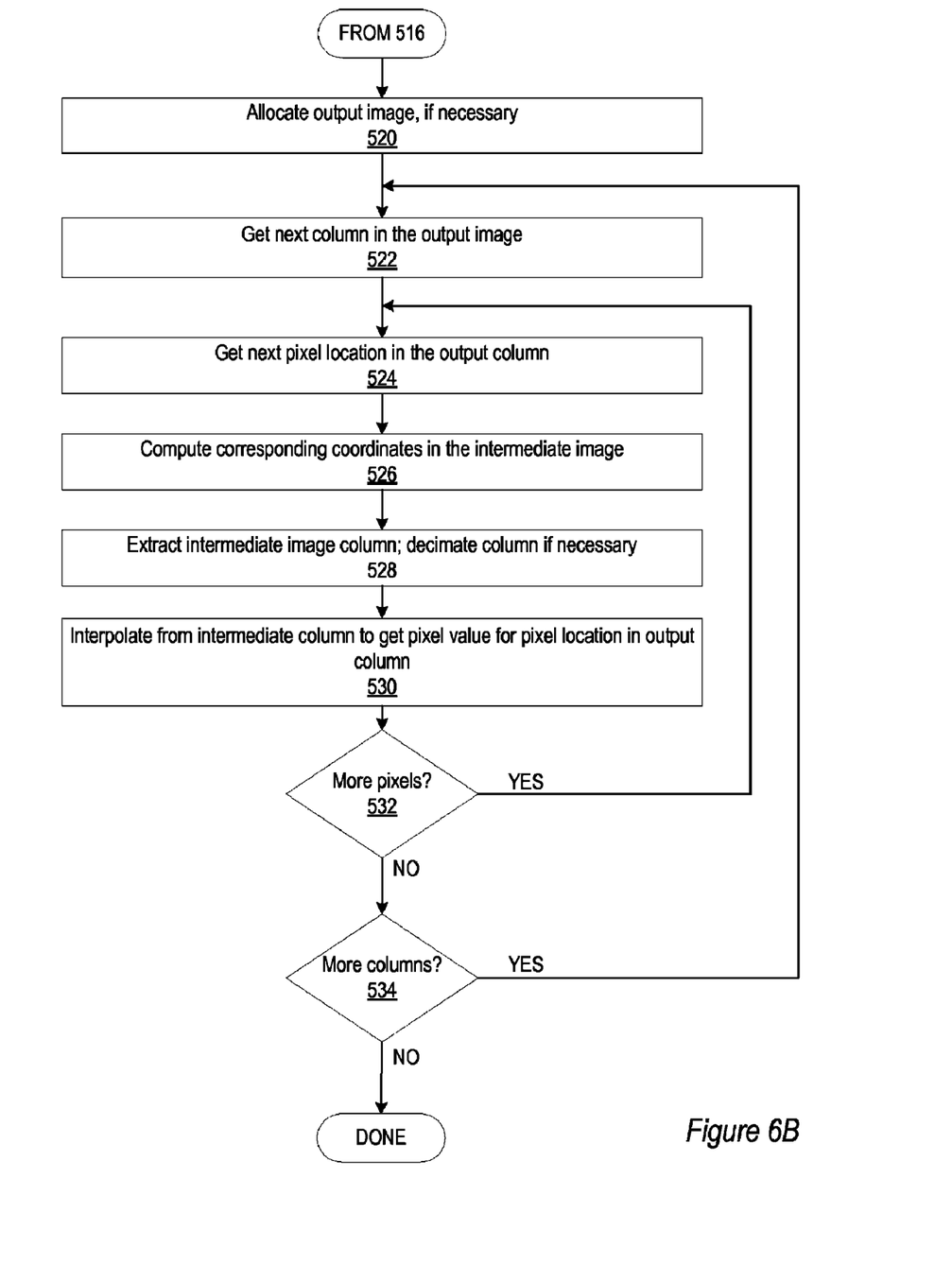

FIGS. 6A and 6B illustrate a method for removing geometric distortion from images, according to some embodiments. The method may be implemented in the geometric distortion removal module 400 illustrated in FIGS. 4 and 5. Elements 504 through 516 of FIG. 6A may be implemented in row rendering component 430 of FIG. 5, while elements 522 through 534 of FIG. 6B may be implemented in column rendering component 434 of FIG. 5. While FIGS. 6A and 6B illustrate row rendering performed first, followed by column rendering, in some embodiments, column rendering may be performed first, and then row rendering.

Referring to FIG. 6A, as indicated at 500, an input image is obtained. The input image may be an image with geometric distortion from which an image with little or no geometric distortion is to be generated according to a geometric distortion removal algorithm as described herein.

As indicated at 502, an intermediate buffer may be allocated. The intermediate buffer may be allocated based on the dimensions of the input image. Note that the dimensions of the intermediate buffer may be larger or smaller than the dimensions of the input image if the output image is to be larger or smaller than the input image. As previously noted, in some embodiments, instead of allocating separate buffers for the intermediate buffer and the output image, a single buffer may be obtained and used for both the intermediate buffer and the output image.

As indicated at 504, a next row in the intermediate buffer is selected. The row rendering process starts at a first row. Which row the process starts with and in what order the rows are processed may not matter, but for simplicity it may be assumed that the process starts at the first or top row, and sequentially processes the rows.

As indicated at 506, a next pixel location p, q in the current intermediate buffer row is selected. The row rendering process starts at a first pixel location in the intermediate row. In practice, which pixel location the process starts with and in what order the pixels are processed may not matter, but for simplicity it may be assumed that the process starts at the first pixel location, and sequentially processes the pixels. Note that q will be the same for the entire row.

As indicated at 508, corresponding coordinates for the current pixel location in the intermediate buffer row are computed in the input image. Note that the pixel coordinates are not necessarily integral; hence, an interpolation technique may be used to calculate pixel values in the intermediate buffer row from pixel values in the input image row.

As indicated at 510, the corresponding input image row (q) may be extracted, if necessary. The extracted input image row may be decimated, if necessary. Decimation may be necessary if the size of the rows in the intermediate buffer (and in the output image) is substantially smaller than the size of the rows in the input image. Also note that 510 (row extraction and decimation) may be performed only once for each row in the input image, e.g. when the first pixel in the intermediate buffer row is being calculated, and thus is not performed for each pixel in the intermediate row.

As indicated at 512, 1-D (one dimensional) interpolation is applied to the extracted and possibly decimated input row to get the pixel value for the current pixel location in the intermediate row. Any of various interpolation techniques may be used, including, but not limited to, linear and cubic interpolation.

At 514, if there are more pixels in the intermediate buffer row to be calculated, the method returns to 506 to calculate the value for the next pixel in the row. If the intermediate buffer row has been fully rendered, i.e. if all pixel values for the row have been calculated, then at 516, if there are more rows in the intermediate buffer, the method returns to 504. If all rows in the intermediate buffer have been rendered, then the method goes to 520 of FIG. 6B.

Referring to FIG. 6B, as indicated at 520, an output image may be allocated, if necessary. Note that the output image may have been previously allocated, for example before element 504 of FIG. 6A. The output image may be allocated based on the dimensions of the input image. Note that the dimensions of the output image may be the same as, larger than, or smaller than the dimensions of the input image.

As indicated at 522, a next column in the output image is selected. The column rendering process starts at a first column. Which column the process starts with and in what order the columns are processed may not matter, but for simplicity it may be assumed that the process starts at the first or leftmost column, and sequentially processes the columns.

As indicated at 524, a next pixel location p, q in the current output image column is selected. The column rendering process starts at a first pixel location in the output image column. Which pixel location the process starts with and in what order the pixels are processed may not matter, but for simplicity it may be assumed that the process starts at the first pixel location, and sequentially processes the pixels. Note that p will be the same for the entire column.

As indicated at 526, corresponding coordinates for the current pixel location in the output image column are computed in the intermediate buffer. Note that the pixel coordinates are not necessarily integral; hence, an interpolation technique may be used to calculate pixel values in the output image column from pixel values in the intermediate buffer column.

As indicated at 528, the corresponding intermediate buffer column (p) may be extracted, if necessary. The extracted intermediate buffer column may be decimated, if necessary. Decimation may be necessary if the size of the columns in the output image is substantially smaller than the size of the columns in the input image. Also note that 528 (column extraction and decimation) may be performed only once for each column in the intermediate buffer, e.g. when the first pixel in the current output image column is being calculated, and thus is not performed for each pixel in the output image column.

As indicated at 530, 1-D (one dimensional) interpolation is applied to the extracted and possibly decimated intermediate buffer column to get the pixel value for the current pixel location in the output image column. Any of various interpolation techniques may be used, including, but not limited to, linear and cubic interpolation.

At 532, if there are more pixels in output image column to be calculated, the method returns to 524 to calculate the value for the next pixel in the row. If the output image column has been fully rendered, i.e. if all pixel values for the column have been calculated, then at 534, if there are more columns in the output image, the method returns to 522. If all columns in the output image have been rendered, then the output image has been fully rendered. The output image may, for example, be stored to a storage medium, as illustrated in FIG. 5.

General Geometric Distortion Removal Algorithm

The following provides more detail for the general geometric distortion removal algorithm according to some embodiments, and provides examples of equations that may be used at various steps of the geometric distortion removal process, for example as illustrated in and described for FIGS. 6A and 6B. Embodiments of the geometric distortion removal algorithm described herein compute an image with reduced or removed geometric lens distortion, denoted as I, from an image with geometric lens distortion, denoted as $I_d$. The subscript $_d$ is used to signify distortion. Embodiments may use a 5-parameter general lens distortion model that includes both radial and tangential components. This model captures both radial and tangential distortions that may be produced by rectilinear lenses. The five parameters of the model may be designated as $[k_1, k_2, k_3, k_4, k_5]$. These values assigned to these parameters indicate the amount of distortion (either radial or tangential) introduced by a particular lens. In some embodiments, the model has three parameters that indicate the amount of radial distortion ($k_1, k_2, k_5$) and two parameters that indicate the amount tangential distortion ($k_3, k_4$). Values for the parameters are assumed to be known. The values, for example, may have been previously estimated using any of various techniques, for example a camera/lens calibration technique. Values for the parameters may be provided by the lens manufacturer, or may be obtained from other sources.

The transformation from undistorted image coordinates (x, y) to distorted images coordinates ($x_d$, $y_d$) may be described as:

$$x_d = \bar{x}(1 + k_1 r^2 + k_2 r^4 + k_5 r^6) + 2k_3 \overline{xy} + k_4(r^2 + 2\bar{x}^2) + d_x,$$

$$y_d = \bar{y}(1 + k_1 r^2 + k_2 r^4 + k_5 r^6) + k_3(r^2 + 2\bar{y}^2) + 2k_4 \overline{xy} + d_y,$$

where $\bar{x} = x - c_x$ and $\bar{y} = y - c_y$, where ($c_x$, $c_y$) is the image center for the undistorted image, and where ($d_x$, $d_y$) is the image center for the distorted image and $r = \sqrt{\bar{x}^2 \bar{y}^2}$.

Conventional distortion removal techniques use two-dimensional (2-D) interpolation. Embodiments of the geometric distortion removal process described herein instead employ a two-pass algorithm that uses one-dimensional (1-D) interpolation. The two-pass algorithm may decompose the computation as follows:

$$(x_d, y_d) \rightarrow (x, y_d),$$

$$(x, y_d) \rightarrow (x, y).$$

Alternatively, the algorithm may decompose the computation as follows:

$$(x_d, y_d) \rightarrow (x_d, y),$$

$$(x_d, y) \rightarrow (x, y).$$

Technically, these two alternatives are very similar. In practice, either alternative may be used. For simplicity, details of only the first alternative are provided herein. However, it is to be understood that the second alternative may be implemented in some embodiments, and that the algorithm and equations for the second alternative would be similar to the following.

In some embodiments, temporary buffers may be allocated or otherwise obtained. A 2-D temporary buffer of proper size based on the input image may be allocated. This buffer may be referred to as the intermediate buffer, and corresponds to element 432 of FIG. 5. As previously noted, in some embodiments, instead of allocating separate buffers for the intermediate buffer and the output image, a single buffer may be obtained and used for both the intermediate buffer and the output image. A temporary 1-D buffer of the proper size based on the input image row size may also be allocated or otherwise obtained.

Row Rendering

In some embodiments, for each row in the intermediate buffer, the following is performed. Let $(x, y_d)$ designate the coordinates for a pixel in the current intermediate buffer row. Note that $y_d$ will be the same for the entire intermediate buffer row. For each x in the intermediate buffer row, $x_d$ is solved for and output into the temporary 1-D buffer. The following describes a method for solving for $x_d$ given $(x, y_d)$, according to some embodiments. First, given $(x, y_d)$, the method solves for y using the following iterative algorithm:

$$y_{i+1} = \frac{(y_d - d_y) - [k_3(r_i^2 + 2(y_i - c_y)^2) + 2k_4\bar{x}(y_i - c_y)]}{1 + k_1 r_i^2 + k_2 r_i^4 + k_5 r_i^6} + c_y,$$

where $r_i = \sqrt{\bar{x}^2 + (y_i - c_y)^2}$ and $y_0 = y_d$. Five iterations are generally sufficient, although fewer or more iterations may be performed. After solving for y given $(x, y_d)$, the following may be performed to find $x_d$:

$$x_d = \bar{x}(1 + k_1 r^2 + k_2 r^4 + k_5 r^6) + 2k_3 \bar{x}\bar{y} + k_4(r^2 + 2\bar{x}^2) + d_x.$$

After solving for $x_d$ for each x in the current row of the intermediate buffer, the following is performed. The input image row at position $y_d$ may be extracted into an input row buffer. The input row buffer may be decimated, if necessary. A one-dimensional interpolation is performed to generate pixel values for the current intermediate buffer row from the pixel values in the input row buffer.

Column Rendering

In some embodiments, for each column in the output image, the following is performed. Let (x, y) designate the coordinates for a pixel in the output image column. Note that x will be the same for the entire column. For each y in the column, $y_d$ is solved for, and $y_d$ is output into the 1-D buffer. In some embodiments, the following may be performed to solve for $y_d$ given (x, y):

$$y_d = \bar{y}(1 + k_1 r^2 + k_2 r^4 + k_5 r^6) + k_3(r^2 + 2\bar{y}^2) + 2k_4\bar{x}\bar{y} + d_y.$$

The intermediate buffer column at position x may be extracted into a column buffer. The extracted column buffer may be decimated, if necessary. A one-dimensional interpolation is performed to generate pixel values for the output image column from the pixel values in the extracted column buffer.

While embodiments of the geometric distortion removal process are generally described as processing rows first and then processing columns, the processing may be reversed in some embodiments, processing columns first and then rows. Generally speaking, the input image may be rendered first in one planar (x or y) dimension (whether rows or columns) to generate an intermediate image or buffer, and then the intermediate image may be rendered in the other planar dimension to generate an output image.

Any of various interpolation methods, including but not limited to linear and cubic interpolation, may be used to perform interpolation to generate the rows in the intermediate buffer and the columns in the output image in the geometric distortion removal process described above.

Decimation

Decimation is important in reducing or eliminating aliasing. Embodiments implement a two-pass algorithm that uses one-dimensional sampling and one-dimensional interpolation, which allows embodiments to reduce or eliminate aliasing that may occur using conventional two-dimensional interpolation. Further, the two-pass algorithm using one-dimensional interpolation may allow various different interpolation methods to be employed, at least some of which may be impractical using conventional two-dimensional interpolation.

Figure 7:
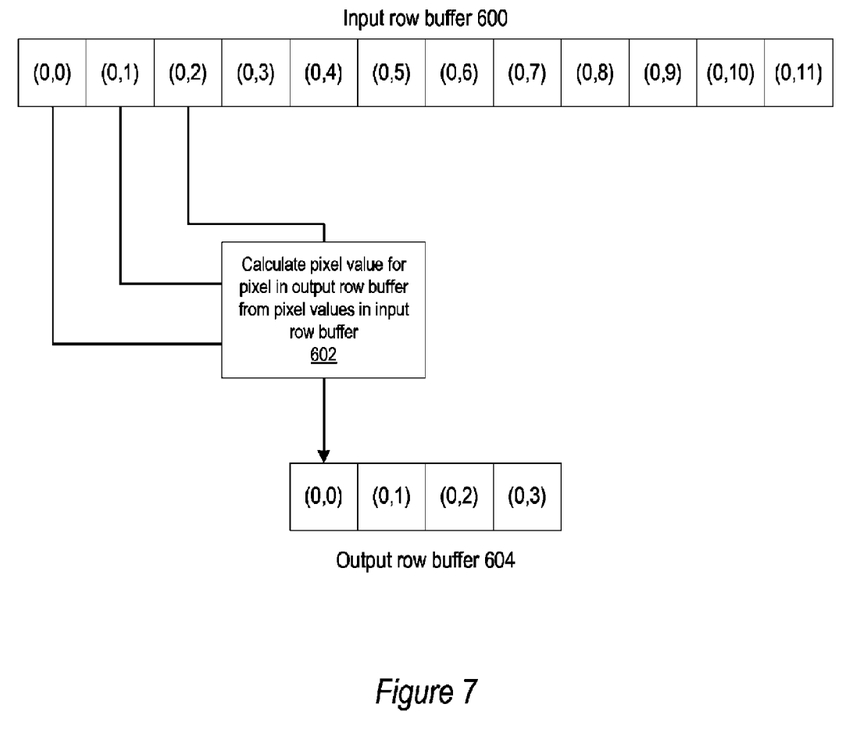
FIG. 7 illustrates a decimation process, according to some embodiments.

FIG. 7 illustrates a decimation process, according to some embodiments. Because embodiments perform one-dimensional (row or column) sampling, in the geometric distortion removal process, and because the dimensions of the output image may be smaller than the dimensions of the input image, an input row or column may be decimated, if necessary, before row or column interpolation is performed to generate pixel values in an output row or column. Decimation is important in reducing or eliminating aliasing artifacts.

FIG. 7 illustrates decimation of an example input row to generate an example output row, according to some embodiments, but a similar decimation may be performed on an input column to generate an output column. Input row 600 has twelve pixels (0,0) through (0,11), while output row 604 has four pixels (0,0) through (0,3). The pixel value for each pixel in output row 604 may be calculated from pixel values in the input row 600, as indicated at 602. In some embodiments, averaging may be used to calculate the pixel values for the pixels in the output row 604. In this example, the pixel values for the three pixels (0,0) through (0,2) of input row 600 may be averaged to get the pixel value for pixel (0,0) of output row 604, the pixel values for pixels (0,3) through (0,5) of input row 600 may be averaged to get the pixel value for pixel (0,1) of output row 604, and so on. In some embodiments, normalization may be performed in calculating the pixel values 602. Other embodiments may use other methods to calculate pixel values in output row 604 from pixel values in input row 604. Once output row 604 is generated, the pixel values in decimated output row 604 may be interpolated to generate pixel values in the intermediate buffer, as described herein. Again note that a similar decimation process may be applied when processing columns.

Example Application

An example application for embodiments of the geometric distortion removal module may be in a panoramic image stitching process in which a set of component images are to be stitched to form a panoramic image. In the process, a reference image is selected, and the other images are "warped" in accordance with the center of the reference image to create the panoramic image. Embodiments of the geometric distortion removal module as described herein may be used to first remove general geometric distortion from each of the component images before warping/stitching the images to form the composite panoramic image.

Example System

Various components of embodiments of a geometric distortion removal module may be executed on one or more computer systems, which may interact with various other devices. One such computer system is illustrated by FIG. 8. In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750, such as cursor control device 760, keyboard 770, audio device 790, and display(s) 780. In some embodiments, it is contemplated that embodiments may be implemented using a single instance of computer system 700, while in other embodiments multiple such systems, or multiple nodes making up computer system 700, may be configured to host different portions or instances of embodiments. For example, in some embodiments, some elements may be implemented via one or more nodes of computer system 700 that are distinct from those nodes implementing other elements. In some embodiments, computer system 700 may be a digital camera.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments, processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

In some embodiments, at least one processor 710 may be a graphics processing unit. A graphics processing unit or GPU may be considered a dedicated graphics-rendering device for a personal computer, workstation, game console or other computer system. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the methods disclosed herein for general geometric distortion removal may be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 720 may be configured to store program instructions and/or data accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for a geometric distortion removal module, are shown stored within system memory 720 as program instructions 725 and data storage 735, respectively. In other embodiments, program instructions and/or data may be received, sent or stored upon different types of computer-accessible media or on similar media separate from system memory 720 or computer system 700. Generally speaking, a computer-accessible medium may include storage media or memory media such as magnetic or optical media, e.g., disk or CD/DVD-ROM coupled to computer system 700 via I/O interface 730. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 740.

In some embodiments, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. In addition, in some embodiments some or all of the functionality of I/O interface 730, such as an interface to system memory 720, may be incorporated directly into processor 710.

Network interface 740 may be configured to allow data to be exchanged between computer system 700 and other devices attached to a network, such as other computer systems, or between nodes of computer system 700. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or retrieving data by one or more computer system 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

As shown in FIG. 8, memory 720 may include program instructions 725, configured to implement embodiments of a geometric distortion removal module as described herein, and data storage 735, comprising various data accessible by program instructions 725. In some embodiments, program instructions 725 may include software elements of a geometric distortion removal module as illustrated in the above Figures. Data storage 735 may include data that may be used in embodiments. In other embodiments, other or different software elements and data may be included.

Those skilled in the art will appreciate that computer system 700 is merely illustrative and is not intended to limit the scope of a geometric distortion removal module as described herein. In particular, the computer system and devices may include any combination of hardware or software that can perform the indicated functions, including computers, network devices, internet appliances, PDAs, wireless phones, pagers, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent examples of embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A computer-implemented method, comprising:
 rendering, by one or more computing devices, an output image from an input image, wherein the input image has general geometric distortion, wherein the general geometric distortion includes at least one radial distortion component and at least one tangential distortion component, and wherein said rendering an output image comprises:
 rendering each one-dimensional element in a first planar dimension of the input image to generate pixel values in a corresponding one-dimensional element in the first planar dimension of an intermediate buffer, wherein said rendering comprises, for each pixel in each element in the first planar dimension of the intermediate buffer:
 calculating a pixel coordinate in the first planar dimension, wherein the calculated pixel coordinate in the first planar dimension accounts for at least a portion of the general geometric distortion of the input image in the first planar dimension; and
 performing interpolation at the calculated pixel coordinate in the first planar dimension in the input image to generate a pixel value for the current pixel in the intermediate buffer; and
 rendering each one-dimensional element in a second planar dimension of the intermediate buffer to generate pixel values in a corresponding one-dimensional element in the second planar dimension of the output image, wherein said rendering comprises, for each pixel in each element in the second planar dimension of the output image:
 calculating a pixel coordinate in the second planar dimension, wherein the calculated pixel coordinate in the second planar dimension accounts for at least a portion of the general geometric distortion of the input image in the second planar dimension; and
 performing interpolation at the distorted pixel coordinate in the second planar dimension in the intermediate image to generate a pixel value for the current pixel in the output image;
 wherein at least a portion of the general geometric distortion present in the input image is not present in the output image.

2. The computer-implemented method as recited in claim 1, wherein the radial distortion component is one of barrel distortion and pincushion distortion.

3. The computer-implemented method as recited in claim 1, wherein the elements in the first planar dimension are rows, and wherein the elements in the second planar dimensions are columns.

4. The computer-implemented method as recited in claim 1, wherein the elements in the first planar dimension are columns, and wherein the elements in the second planar dimensions are rows.

5. The computer-implemented method as recited in claim 1, further comprising decimating the element in the first planar dimension of the input image prior to said interpolation.

6. The computer-implemented method as recited in claim 1, wherein said calculating a pixel coordinate in the first planar dimension comprises solving for $x_d$ given coordinates $(x, y_d)$ in the intermediate buffer, where subscript $_d$ signifies a pixel coordinate in the distorted image, and wherein said solving for $x_d$ given $(x, y_d)$ comprises:
 solving for y by iteratively performing $$y_{i+1} = \frac{(y_d - d_y) - [k_3(r_i^2 + 2(y_i - c_y)^2) + 2k_4\bar{x}(y_i - c_y)]}{1 + k_1 r_i^2 + k_2 r_i^4 + k_5 r_i^6} + c_y,$$

where $k_1$, $k_2$, and $k_5$ correspond to radial distortion parameters, $k_3$ and $k_4$ correspond to tangential distortion parameters, $(c_x, c_y)$ is the image center for the undistorted image, $(d_x, d_y)$ is the image center for the distorted image, $r_i = \sqrt{\bar{x}^2 + (y_i - c_y)^2}$, and $y_0 = y_d$; and solving for $x_d$ by performing $$x_d=\bar{x}(1+k_1r^2+k_2r^4+k_5r^6)+2k_3\overline{xy}+k_4(r^2+2\bar{x}^2)+d_x$$

where $r=\sqrt{\bar{x}^2+\bar{y}^2}$.

7. The computer-implemented method as recited in claim 1, further comprising decimating the element in the second planar dimension of the intermediate buffer prior to said interpolation.

8. The computer-implemented method as recited in claim 1, wherein said calculating a pixel coordinate in the second planar dimension comprises solving for $y_d$ given coordinates (x, y) in the output buffer by performing $$y_d=\bar{y}(1+k_1r^2+k_2r^4+k_5r^6)+k_3(r^2+2\bar{y}^2)+2k_4\overline{xy}+d_y$$

where $k_1$, $k_2$, and $k_5$ correspond to radial distortion parameters, $k_3$ and $k_4$ correspond to tangential distortion parameters, $(d_x, d_y)$ is the image center for the distorted image, subscript $_d$ signifies a pixel coordinate in the distorted image, and $r=\sqrt{\bar{x}^2+\bar{y}^2}$.

9. The computer-implemented method as recited in claim 1, wherein said rendering an output image from an input image with general geometric distortion is performed according to a parametric general lens distortion model that includes both radial distortion and tangential distortion components.

10. A system, comprising:
at least one processor; and
a memory comprising program instructions, wherein the program instructions are executable by the at least one processor to render an output image from an input image, wherein the input image has general geometric distortion, wherein the general geometric distortion includes at least one radial distortion component and at least one tangential distortion component, and wherein, to render an output image, the program instructions are executable by the at least one processor to:
  render each one-dimensional element in a first planar dimension of the input image to generate pixel values in a corresponding one-dimensional element in the first planar dimension of an intermediate buffer, wherein, to perform said rendering, the program instructions are executable by the at least one processor to, for each pixel in each element in the first planar dimension of the intermediate buffer:
    calculate a pixel coordinate in the first planar dimension, wherein the calculated pixel coordinate in the first planar dimension accounts for at least a portion of the general geometric distortion of the input image in the first planar dimension; and
    perform interpolation at the calculated pixel coordinate in the first planar dimension in the input image to generate a pixel value for the current pixel in the intermediate buffer; and
  render each one-dimensional element in a second planar dimension of the intermediate buffer to generate pixel values in a corresponding one-dimensional element in the second planar dimension of the output image, wherein, to perform said rendering, the program instructions are executable by the at least one processor to, for each pixel in each element in the second planar dimension of the output image:
    calculate a pixel coordinate in the second planar dimension, wherein the calculated pixel coordinate in the second planar dimension accounts for at least a portion of the general geometric distortion of the input image in the second planar dimension; and
    perform interpolation at the distorted pixel coordinate in the second planar dimension in the intermediate image to generate a pixel value for the current pixel in the output image;
  wherein at least a portion of the general geometric distortion present in the input image is not present in the output image.

11. The system as recited in claim 10, wherein the radial distortion component is one of barrel distortion and pincushion distortion.

12. The system as recited in claim 10, wherein the elements in the first planar dimension are rows, and wherein the elements in the second planar dimensions are columns.

13. The system as recited in claim 10, wherein the elements in the first planar dimension are columns, and wherein the elements in the second planar dimensions are rows.

14. The system as recited in claim 10, wherein the program instructions are executable by the at least one processor to decimate the element in the first planar dimension of the input image prior to said interpolation.

15. The system as recited in claim 10, wherein, to calculate a pixel coordinate in the first planar dimension, the program instructions are executable by the at least one processor to solve for $x_d$ given coordinates $(x, y_d)$ in the intermediate buffer, where subscript $_d$ signifies a pixel coordinate in the distorted image, and wherein, to solve for $x_d$ given $(x, y_d)$, the program instructions are executable by the at least one processor to:
solve for y by iteratively performing $$y_{i+1} = \frac{(y_d - d_y) - [k_3(r_i^2 + 2(y_i - c_y)^2) + 2k_4\bar{x}(y_i - c_y)]}{1 + k_1r_i^2 + k_2r_i^4 + k_5r_i^6} + c_y,$$

where $k_1$, $k_2$, and $k_5$ correspond to radial distortion parameters, $k_3$ and $k_4$ correspond to tangential distortion parameters, $(c_x, c_y)$ is the image center for the undistorted image, $(d_x, d_y)$ is the image center for the distorted image, $r_i=\sqrt{\bar{x}^2+(y_i-c_y)^2}$, and $y_0=y_d$; and
solve for $x_d$ by performing $$x_d=\bar{x}(1+k_1r^2+k_2r^4+k_5r^6)+2k_3\overline{xy}+k_4(r^2+2\bar{x}^2)+d_x$$

where $r=\sqrt{\bar{x}^2+\bar{y}^2}$.

16. The system as recited in claim 10, wherein the program instructions are executable by the at least one processor to decimate the element in the second planar dimension of the intermediate buffer prior to said interpolation.

17. The system as recited in claim 10, wherein, to calculate a pixel coordinate in the second planar dimension, the program instructions are executable by the at least one processor to solve for $y_d$ given coordinates (x, y) in the output buffer according to $$y_d=\bar{y}(1+k_1r^2+k_2r^4+k_5r^6)+k_3(r^2+2\bar{y}^2)+2k_4\overline{xy}+d_y$$

where $k_1$, $k_2$, and $k_5$ correspond to radial distortion parameters, $k_3$ and $k_4$ correspond to tangential distortion parameters, $(d_x, d_y)$ is the image center for the distorted image, subscript $_d$ signifies a pixel coordinate in the distorted image, and $r=\sqrt{\bar{x}^2+\bar{y}^2}$.

18. The system as recited in claim 10, wherein the program instructions are executable by the at least one processor to render the output image from the input image with general geometric distortion according to a parametric general lens distortion model that includes both radial distortion and tangential distortion components.

19. The system as recited in claim 10, wherein the system is a digital camera.

20. A non-transitory computer-readable storage medium storing program instructions, wherein the program instructions are computer-executable to implement:
rendering an output image from an input image, wherein the input image has general geometric distortion, wherein the general geometric distortion includes at least one radial distortion component and at least one tangential distortion component, and wherein, in said rendering an output image, the program instructions are computer-executable to implement:
rendering each one-dimensional element in a first planar dimension of the input image to generate pixel values in a corresponding one-dimensional element in the first planar dimension of an intermediate buffer, wherein in said rendering the program instructions are computer-executable to implement, for each pixel in each element in the first planar dimension of the intermediate buffer:
calculating a pixel coordinate in the first planar dimension, wherein the calculated pixel coordinate in the first planar dimension accounts for at least a portion of the general geometric distortion of the input image in the first planar dimension; and
performing interpolation at the calculated pixel coordinate in the first planar dimension in the input image to generate a pixel value for the current pixel in the intermediate buffer; and
rendering each one-dimensional element in a second planar dimension of the intermediate buffer to generate pixel values in a corresponding one-dimensional element in the second planar dimension of the output image, wherein in said rendering the program instructions are computer-executable to implement, for each pixel in each element in the second planar dimension of the output image:
calculating a pixel coordinate in the second planar dimension, wherein the calculated pixel coordinate in the second planar dimension accounts for at least a portion of the general geometric distortion of the input image in the second planar dimension; and
performing interpolation at the distorted pixel coordinate in the second planar dimension in the intermediate image to generate a pixel value for the current pixel in the output image;
wherein at least a portion of the general geometric distortion present in the input image is not present in the output image.

21. The non-transitory computer-readable storage medium as recited in claim 20, wherein the radial distortion component is one of barrel distortion and pincushion distortion.

22. The non-transitory computer-readable storage medium as recited in claim 20, wherein the elements in the first planar dimension are rows, and wherein the elements in the second planar dimensions are columns.

23. The non-transitory computer-readable storage medium as recited in claim 20, wherein the elements in the first planar dimension are columns, and wherein the elements in the second planar dimensions are rows.

24. The non-transitory computer-readable storage medium as recited in claim 20, wherein the program instructions are further computer-executable to implement decimating the element in the first planar dimension of the input image prior to said interpolation.

25. The non-transitory computer-readable storage medium as recited in claim 20, wherein, in said calculating a pixel coordinate in the first planar dimension, the program instructions are computer-executable to implement solving for $x_d$ given coordinates $(x, y_d)$ in the intermediate buffer, where subscript $_d$ signifies a pixel coordinate in the distorted image, and wherein said solving for $x_d$ given $(x, y_d)$ comprises:
solving for y by iteratively performing $$y_{i+1} = \frac{(y_d - d_y) - [k_3(r_i^2 + 2(y_i - c_y)^2) + 2k_4\bar{x}(y_i - c_y)]}{1 + k_1 r_i^2 + k_2 r_i^4 + k_5 r_i^6} + c_y,$$

where $k_1$, $k_2$, and $k_5$ correspond to radial distortion parameters, $k_3$ and $k_4$ correspond to tangential distortion parameters, $(c_x, c_y)$ is the image center for the undistorted image, $(d_x, d_y)$ is the image center for the distorted image, $r_i = \sqrt{\bar{x}^2 + (y_i - c_y)^2}$, and $y_0 = y_d$; and
solving for $x_d$ by performing $$x_d = \bar{x}(1 + k_1 r^2 + k_2 r^4 + k_5 r^6) + 2k_3 \overline{xy} + k_4(r^2 + 2\bar{x}^2) + d_x$$

where $r = \sqrt{\bar{x}^2 + \bar{y}^2}$.

26. The non-transitory computer-readable storage medium as recited in claim 20, wherein the program instructions are computer-executable to implement decimating the element in the second planar dimension of the intermediate buffer prior to said interpolation.

27. The non-transitory computer-readable storage medium as recited in claim 20, wherein, in said calculating a pixel coordinate in the second planar dimension, the program instructions are computer-executable to implement solving for $y_d$ given coordinates $(x, y)$ in the output buffer by performing $$y_d = \bar{y}(1 + k_1 r^2 + k_2 r^4 + k_5 r^6) + k_3(r^2 + 2\bar{y}^2) + 2k_4 \overline{xy} + d_y$$

where $k_1$, $k_2$, and $k_5$ correspond to radial distortion parameters, $k_3$ and $k_4$ correspond to tangential distortion parameters, $(d_x, d_y)$ is the image center for the distorted image, subscript $_d$ signifies a pixel coordinate in the distorted image, and $r = \sqrt{\bar{x}^2 + \bar{y}^2}$.

28. The non-transitory computer-readable storage medium as recited in claim 20, wherein the program instructions are computer-executable to perform said rendering the output image from the input image with general geometric distortion according to a parametric general lens distortion model that includes both radial distortion and tangential distortion components.

29. A computer-implemented method, comprising:
executing instructions on a specific apparatus so that binary digital electronic signals representing an output image are rendered from binary digital electronic signals representing an input image, wherein the input image has general geometric distortion, wherein the general geometric distortion includes at least one radial distortion component and at least one tangential distortion component, and wherein said rendering the output image from the input image comprises:
rendering each one-dimensional element in a first planar dimension of the input image to generate pixel values in a corresponding one-dimensional element in the first planar dimension of binary digital electronic signals representing an intermediate buffer, wherein said rendering comprises, for each pixel in each element in the first planar dimension of the intermediate buffer:
calculating a pixel coordinate in the first planar dimension, wherein the calculated pixel coordinate in the first planar dimension accounts for at least a portion of the general geometric distortion of the input image in the first planar dimension; and performing interpolation at the calculated pixel coordinate in the first planar dimension in the input image to generate a pixel value for the current pixel in the intermediate buffer; and rendering each one-dimensional element in a second planar dimension of the intermediate buffer to generate pixel values in a corresponding one-dimensional element in the second planar dimension of the output image, wherein said rendering comprises, for each pixel in each element in the second planar dimension of the output image:

calculating a pixel coordinate in the second planar dimension, wherein the calculated pixel coordinate in the second planar dimension accounts for at least a portion of the general geometric distortion of the input image in the second planar dimension; and performing interpolation at the distorted pixel coordinate in the second planar dimension in the intermediate image to generate a pixel value for the current pixel in the output image; and storing the output image in a memory location of said specific apparatus for later use, wherein at least a portion of the general geometric distortion present in the input image is not present in the output image.

* * * * *